(12) United States Patent
Prat Terrades et al.

(10) Patent No.: US 8,967,018 B2
(45) Date of Patent: Mar. 3, 2015

(54) DEVICE FOR ADJUSTING THE TENSION OF A PULLING ELEMENT

(75) Inventors: Jaume Prat Terrades, Barcelona (ES); Jordi Jornet Vidal, Terrassa (ES); Albert Planas Girona, Terrassa (ES)

(73) Assignee: Fico Cables, S.A., Mollet del Vallés (ES)

( * ) Notice: Subject to any disclaimer, the term of this patent is extended or adjusted under 35 U.S.C. 154(b) by 1337 days.

(21) Appl. No.: 11/718,973

(22) PCT Filed: Nov. 10, 2005

(86) PCT No.: PCT/EP2005/012049
§ 371 (c)(1),
(2), (4) Date: Nov. 29, 2007

(87) PCT Pub. No.: WO2006/050948
PCT Pub. Date: May 18, 2006

(65) Prior Publication Data
US 2008/0257099 A1   Oct. 23, 2008

(30) Foreign Application Priority Data
Nov. 10, 2004   (DE) .......................... 10 2004 054 326

(51) Int. Cl.
*F16C 1/22*   (2006.01)
(52) U.S. Cl.
CPC ....................................... *F16C 1/22* (2013.01)
USPC .................. 74/501.5 R; 188/196 V; 188/2 D; 24/68 R; 24/71.1

(58) Field of Classification Search
USPC ...... 74/500.5, 501.5 R, 502.6, 424.75, 89.42; 403/166, 304, 43–48; 192/111.12; 280/801.1; 24/68 R, 71.1; 188/196 D, 188/265, 2 D
See application file for complete search history.

(56) References Cited

U.S. PATENT DOCUMENTS

| | | | | |
|---|---|---|---|---|
| 739,298 A * | 9/1903 | Dobson | ......................... | 267/71 |
| 957,315 A * | 5/1910 | Duncanson | .................. | 114/214 |
| 4,105,098 A * | 8/1978 | Klimaitis | ...................... | 188/378 |
| 4,385,548 A * | 5/1983 | Persson et al. | ............ | 188/196 D |
| 4,431,089 A * | 2/1984 | Nadas et al. | ............... | 188/196 D |
| 4,448,090 A * | 5/1984 | Carre et al. | ............. | 74/501.5 R |
| 4,584,898 A * | 4/1986 | Panushka | ................ | 74/501.5 R |
| 4,753,124 A * | 6/1988 | Chevance | ............... | 74/501.5 R |
| 4,798,100 A * | 1/1989 | Baumgarten | ........... | 74/501.5 R |
| 5,377,556 A * | 1/1995 | Byrnes | ........................ | 74/502.6 |
| 5,613,665 A * | 3/1997 | Lund | .............................. | 267/69 |
| 6,193,621 B1 * | 2/2001 | McClosky | ............... | 74/501.5 R |
| 6,279,415 B1 * | 8/2001 | Chance et al. | ........... | 74/501.5 R |
| 7,469,617 B2 * | 12/2008 | Basile et al. | ............. | 74/501.5 R |
| 2004/0262442 A1 * | 12/2004 | Mazouzi et al. | ........... | 242/390.8 |

\* cited by examiner

*Primary Examiner* — Daniel Yabut
(74) *Attorney, Agent, or Firm* — Hartman Titus PLC; John D. Titus

(57) ABSTRACT

The present invention relates to a device for the automatic adjustment of the pretension of a pulling element (10, 11) in particular a cable, comprising an elasticity element (50) acting on a first mounting means (20) for a first section (10) of the pulling element for increasing the pre-tension, a second mounting means (30) for a second section (11) of the pulling element, threads (70, 70', 71) arranged at the first mounting means which interact with a spindle (40, 40') so that a change of the distance between the first mounting means (20) and the second mounting means (30) causes a rotation of the spindle (40) or the threads (70), and blocking elements (36, 45; 236, 245), which are arranged such that they block a rotation of the spindle or the threads (70), respectively, when the pulling element is under pulling load.

13 Claims, 9 Drawing Sheets

DEVICE FOR ADJUSTING THE TENSION OF A PULLING ELEMENT

CROSS REFERENCE TO RELATED APPLICATION

Figure 1:
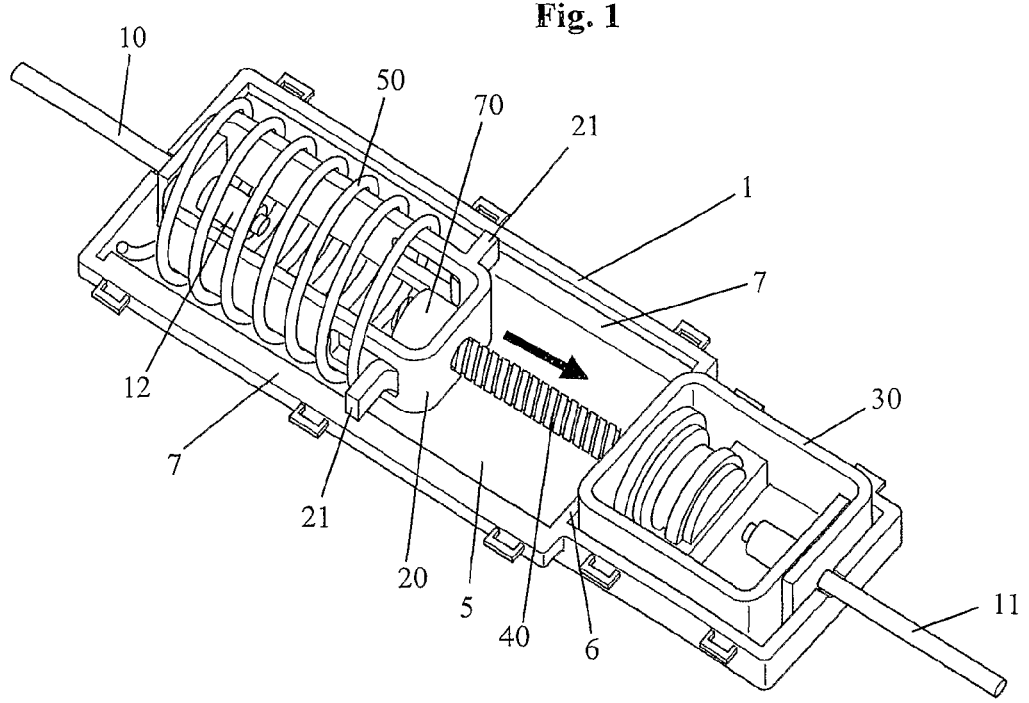

This application is a U.S. national phase application under 35 U.S.C. §371 of International Application No. PCT/EP05/12049 filed Nov. 10, 2005, which claims priority to DE 10 2004 054 326.7 filed Nov. 10, 2004 both of which are herein incorporated by reference in their entirety.

TECHNICAL FIELD

The present invention relates to a device for automatically adjusting the tension of a pulling element, in particular of a Bowden cable.

THE PRIOR ART

Bowden cables are used in many technical fields for control purposes. For example parking brakes for vehicles are commonly operated using Bowden cables. Another example is the transmission of a control movement of a shift lever to the gear box of a motor vehicle or the operation of the control surfaces and flaps of an airplane.

During the first assembly but also over the complete lifetime of a Bowden cable it is necessary to assure that the Bowden cable is sufficiently tensioned. Otherwise there is the risk that an end of the Bowden cable becomes detached. Furthermore, the transmission of a movement from the control element to the device to be controlled becomes unprecise, if the Bowden cable is not pre-tensioned even in its initial configuration. For example in case of a parking brake using a Bowden cable without sufficient tension, the lever must be rotated by a substantial amount before the parking brake is actually applied.

Devices for the adjustment of the pre-tension according to the prior art use for example screws which allow to increase (or decrease) the length of the outer sheath of the Bowden cable relatively to the inner steel cable. Such devices are for example known from the DE OS 2 119 458 and the EP 1 106 493 B1, wherein the latter discloses additionally a device for modulating, i.e. limiting the force transmitted by the cable under use. For facilitating the manual adjustment in case of greater pre-tensions, it is further known to provide spring elements which support the movement of the adjustment screw in the direction of a higher preload. More complex systems for an automated adjustment of the pre-tension of a brake cable for a parking brake are additionally disclosed in the EP 1 380 487 A1.

Furthermore, arrangements for control or Bowden cables are known, which automatically modify the distance between two sections of the outer sheath for tensioning the cable. The inner wire remains integral and is not changed in case of an adjustment. Such constructions are for example disclosed in the GB 2 088 501, the U.S. Pat. No. 4,456,101, the U.S. Pat. No. 4,570,506, the U.S. Pat. No. 4,543,849, the U.S. Pat. No. 4,798,100 and the DE 31 43 765. A disadvantage of such devices is their comparatively bulky shape and the fact that the dimensions of the housing change in case of an adjustment, which renders the attachment difficult, for example inside a motor vehicle. Further, cables without an outer sheath can not be adjusted by such a construction.

A further group of adjustment devices, which can be used also for cables without outer sheath is known from the JP 62292913 A, the JP 2002242923 A and the DE 100 10 641 as well as the WO 01/64490 A1. In the designs disclosed in these documents, the cable terminates in a threaded rod. A nut or the like is arranged around the rod, so that its rotation leads to a linear displacement of the rod. The rod itself can not be rotated, since this would cause a torsion of the cable.

A disadvantage of these arrangements are the complex and bulky mechanisms necessary to cause the rotation of the nut for increasing the tension in the cable.

The JP 2001082438, finally, discloses a comparatively compact design. A disk with teethed surfaces on both of its sides is arranged with a play between two stationary surfaces with corresponding teeth. Each change of load—for example if a parking brake is applied and subsequently released—causes a forth and back movement of the teethed disc under the influence of a spring, which leads to a rotation of the disc. Using a spindle and a nut, this rotation is used to increase each time the tension of the attached cable.

However, due to the necessary play, this device can not transmit precise pulling movements.

It is therefore the problem of the present invention to provide a device for the adjustment of the pre-tension in a pulling element, in particular a Bowden cable, which allows an automatic adjustment, has a compact shape and assures a precise transmission of pulling movements to overcome the above explained disadvantages of the prior art. Furthermore, the device should be easy to produce and easy to operate.

SUMMARY OF THE INVENTION

The present invention solves this problem by providing a device for automatically adjusting the pre-tension of a pulling element, in particular of a cable, comprising an elasticity element, which increases the tension by acting on a first mounting means for a first section of the pulling element, a second mounting means for a second section of the pulling element, threads arranged at the first mounting means, which act on a spindle, such that a change of the distance between the first mounting means and the second mounting means causes a rotation of the spindle or the threads, and blocking elements which are arranged such that they block a rotation of the spindle or the threads, when the pulling element is under pulling load.

The arrangement according to the invention is characterized by a particularly simple automatic adjustment of the pre-tension of the pulling element. If the pre-tension in the pulling element is too low, the elasticity element will move the first mounting means preferably along the spindle in order to return from an initially compressed or elongated position to its relaxed position. As a result, the first mounting means is moved with respect to the second mounting means and causes thereby preferably a shortening of the distance of the two mounting means.

However, when the pulling element is under load, for example when a connected parking brake is operated, the blocking elements according to the invention block a rotation of the spindle or the threads so that the distance between the first and the second mounting means remains unchanged and the device can transmit high pulling loads. As a result, a sufficient pre-tension in the pulling element is assured. The device acts on the pulling element itself and not on the outer sheath of a Bowden cable as in the constructions discussed above. Further, the pre-tension is preferably increased, when the pulling element is essentially free of any load, i.e. before a pulling movement actually takes place. As a result, pulling movements are more directly and more precisely transmitted.

The blocking elements preferably block the rotation of the spindle or the threads, respectively, by a frictional contact. To this end, the blocking elements preferably comprise a rotating disk connected to the spindle or the threads and a friction surface, wherein the frictional contact is provided between the rotating disk and the friction surface. In case of a pulling load, the rotating disk is in a preferred embodiment simply moved against the friction surface so that the rotation of the spindle or the threads, respectively, is preferably blocked without any further constructive measures. The distance between the first and second mounting means therefore remains essentially unchanged.

In the preferred embodiment, the spindle or the threads, respectively, comprises a bearing tip, which can rotate in a bearing recess, wherein the bearing recess is preferably shaped to provide essentially a point contact for the bearing tip. As a result, it is by means of simple constructive measures assured that the spindle or the threads can almost frictionless rotate and do not impair the automatic adjustment of the pre-tension.

Preferably, the device further comprises a blocking means to block the rotation of the spindle or the threads, respectively, also independently from the pulling load. This is particularly advantageous for the first assembly of the device, when it is initially to be avoided that the device tries to create a pre-tension before the pulling element is completely attached, for example in case of a Bowden cable, which has not yet been connected to the brake and the brake lever.

Preferably, the device further comprises a latching means for latching the blocking means in the position which blocks a rotation of the spindle or the threads, respectively, to avoid an unintended release of the blocking means.

Further advantageous developments of the described device are the subject matter of further dependent claims.

SHORT DESCRIPTION OF THE ACCOMPANYING FIGURES

Figure 2:
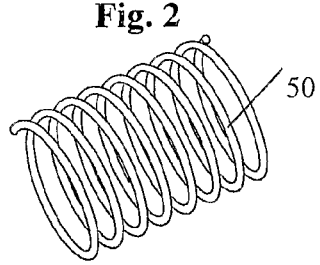
Figure 3:
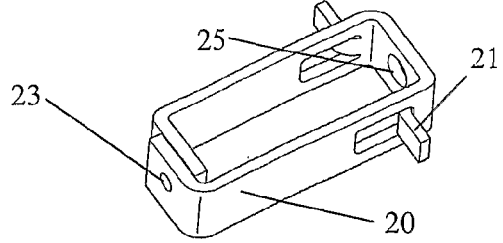
Figure 4:
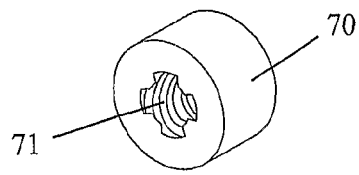
Figure 5:
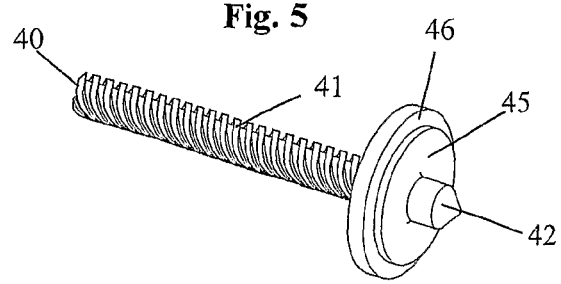
Figure 6:
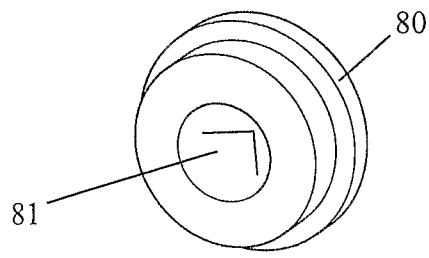
Figure 7:
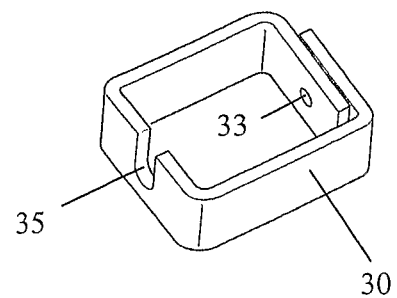
Figure 8A:
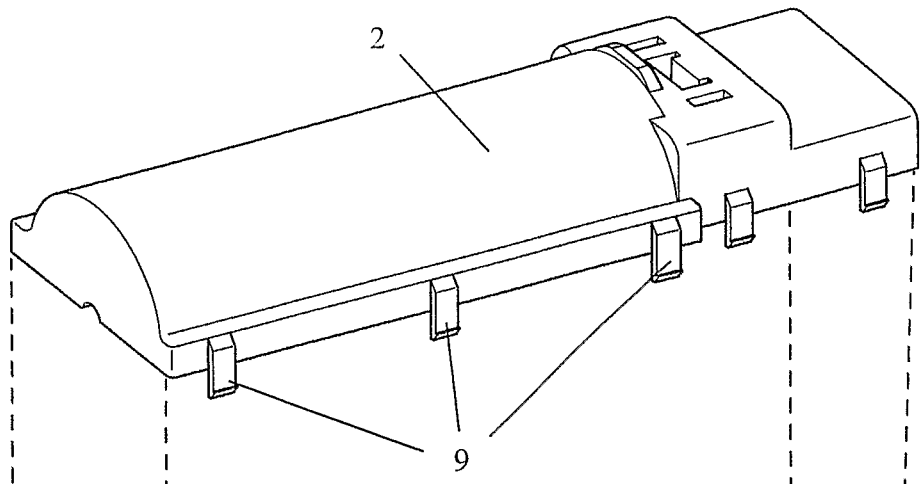
Figure 8B:
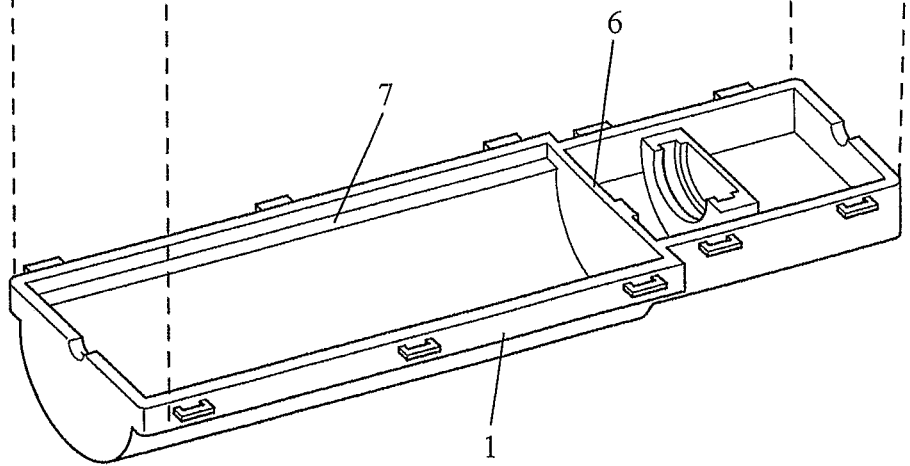
Figure 9A:
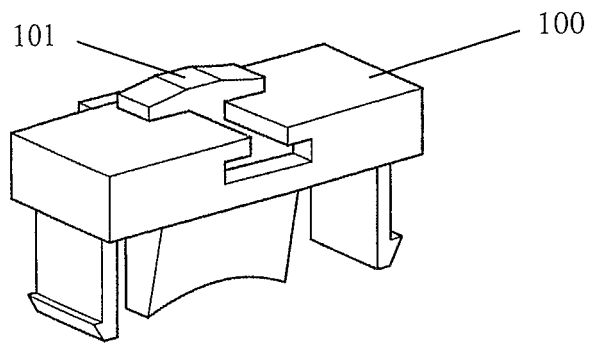
Figure 9B:
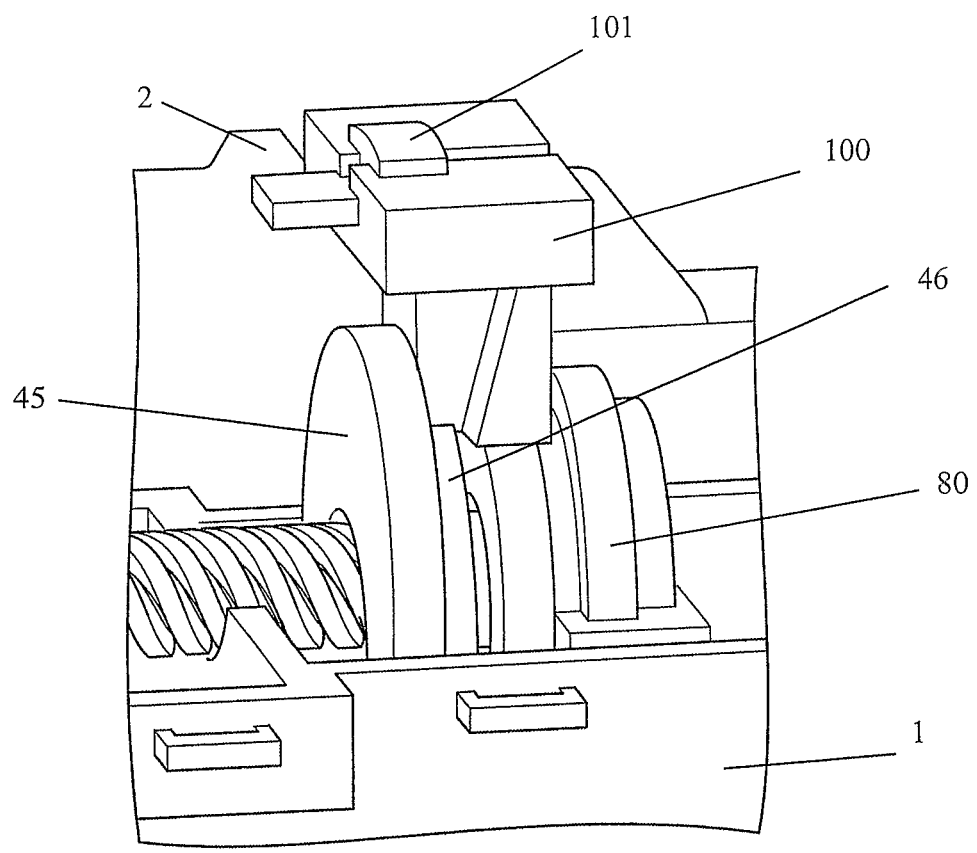
Figure 10:
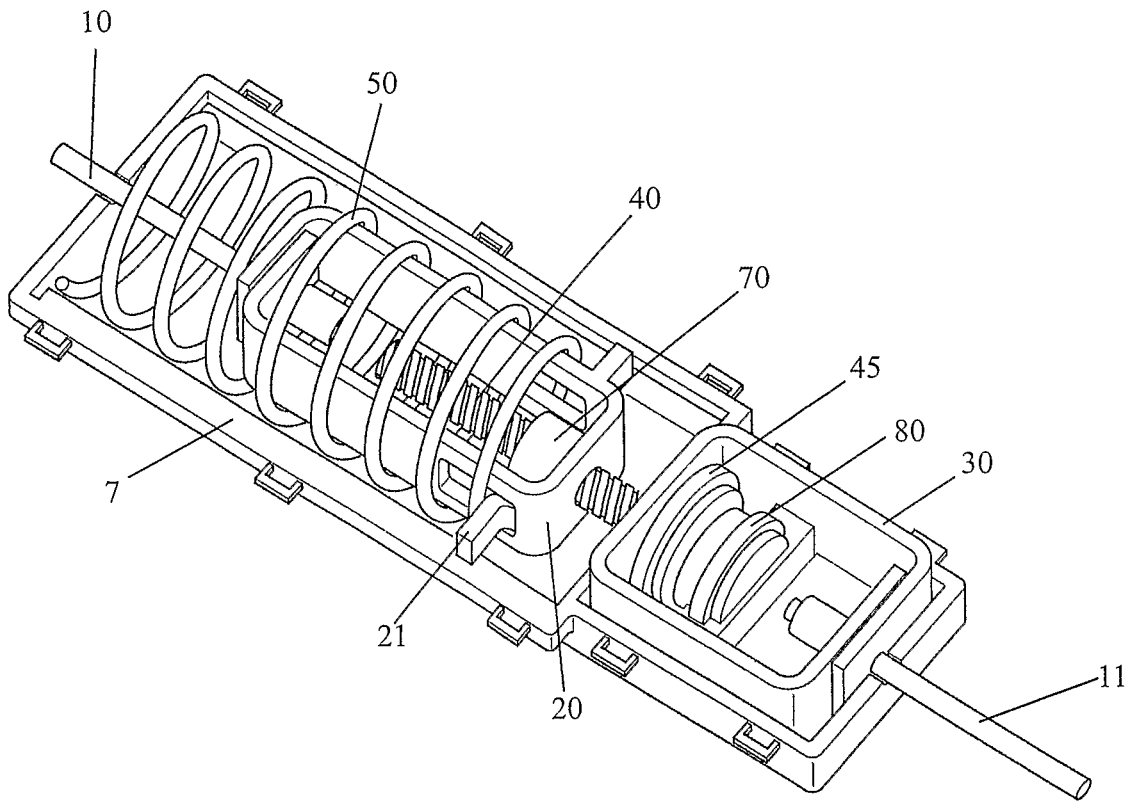
Figure 11:
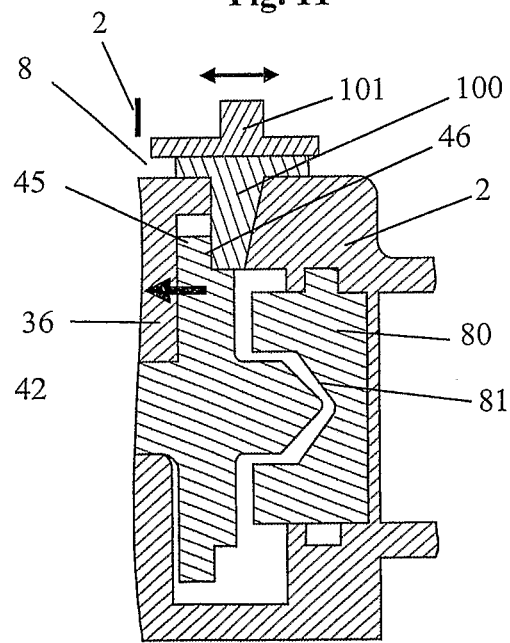
Figure 12:
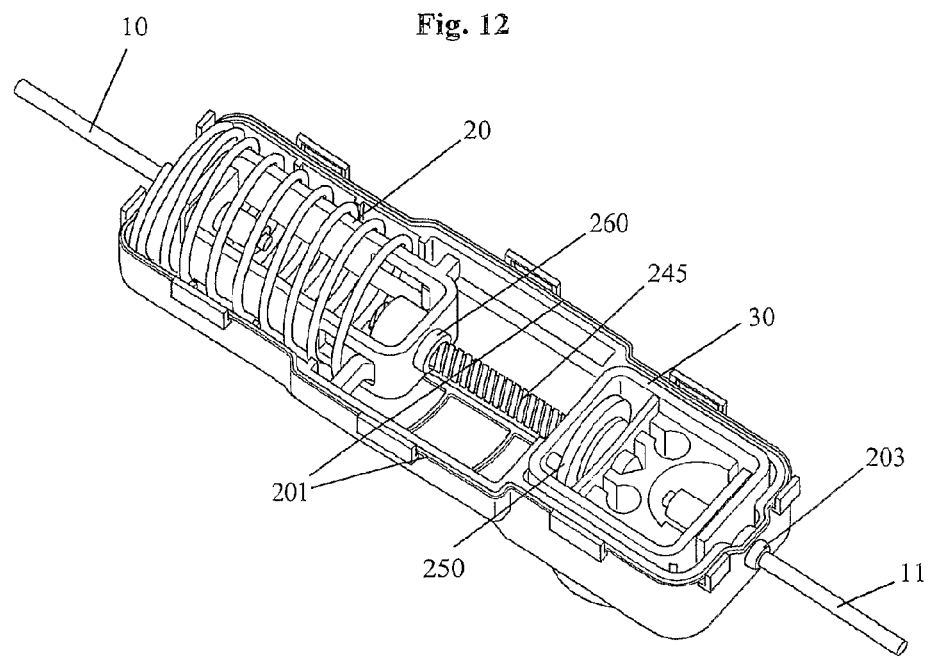
Figures 13A, 13B:
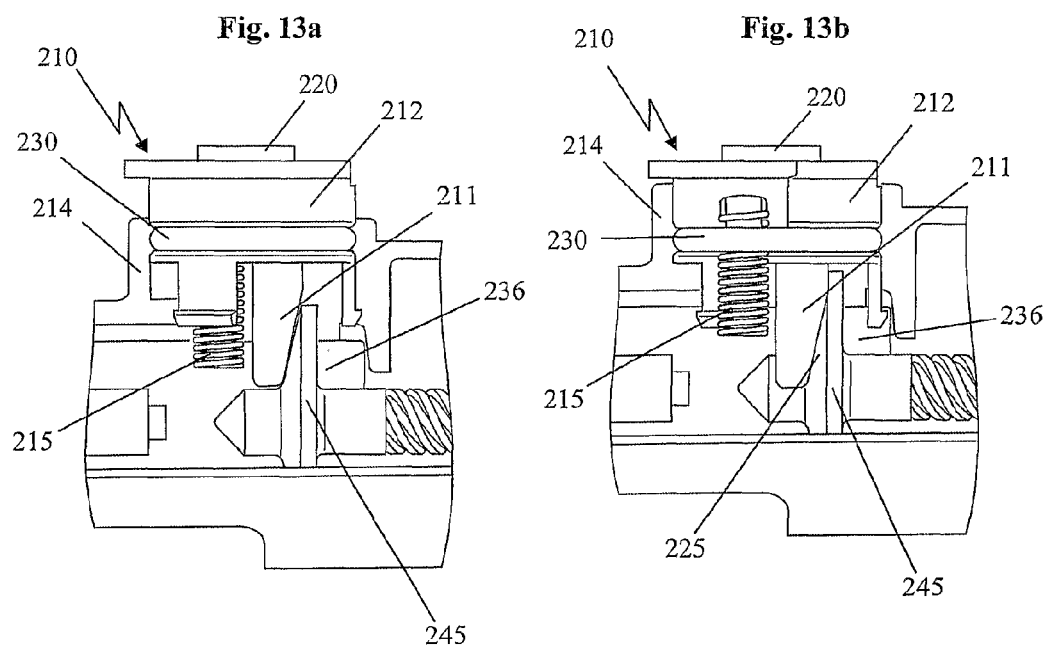
Figure 13C:
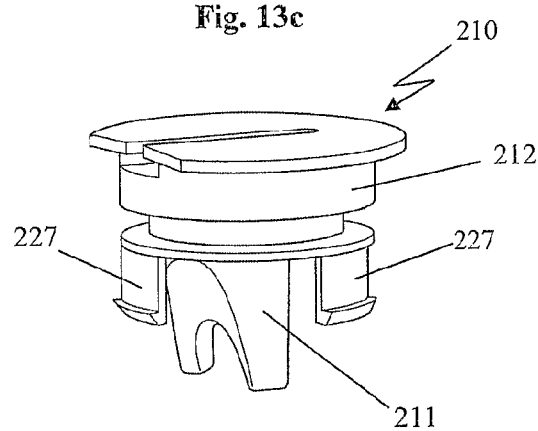
Figure 14:
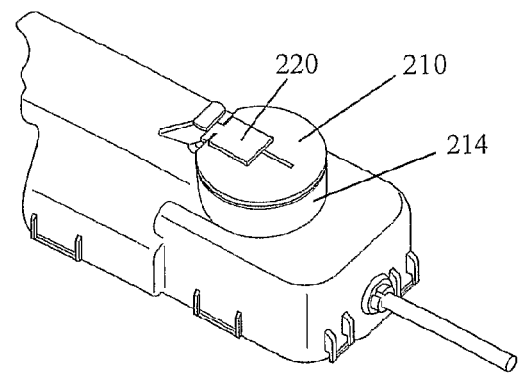
Figure 15:
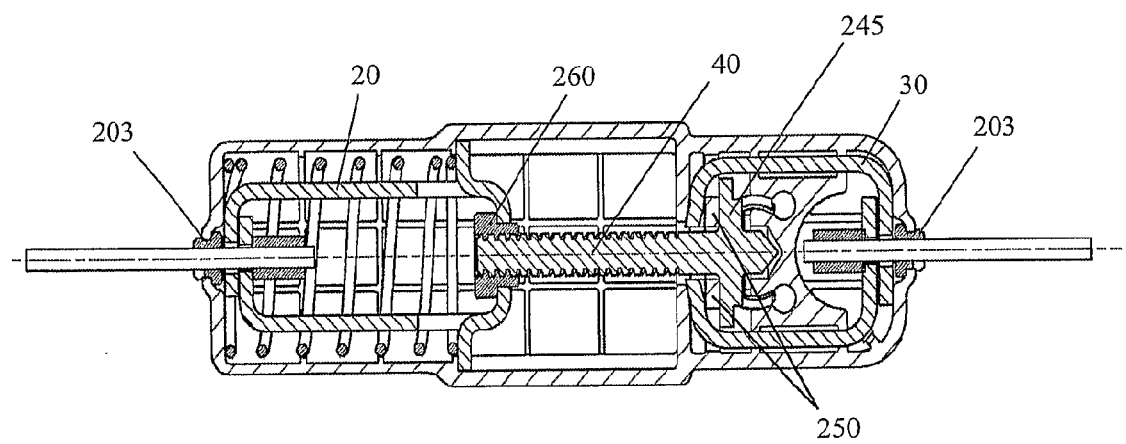
Figure 16:
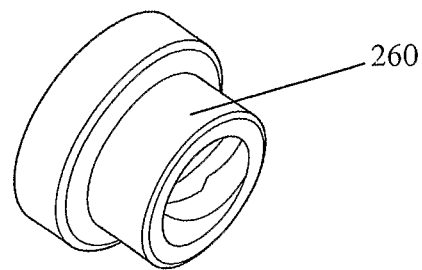
Figure 17:
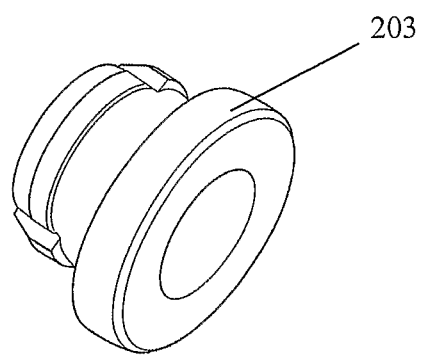
Figure 18:
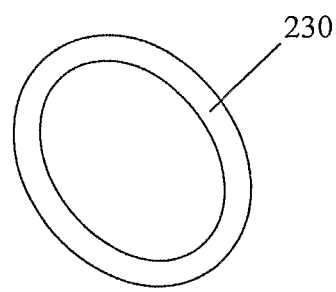
Figure 19:
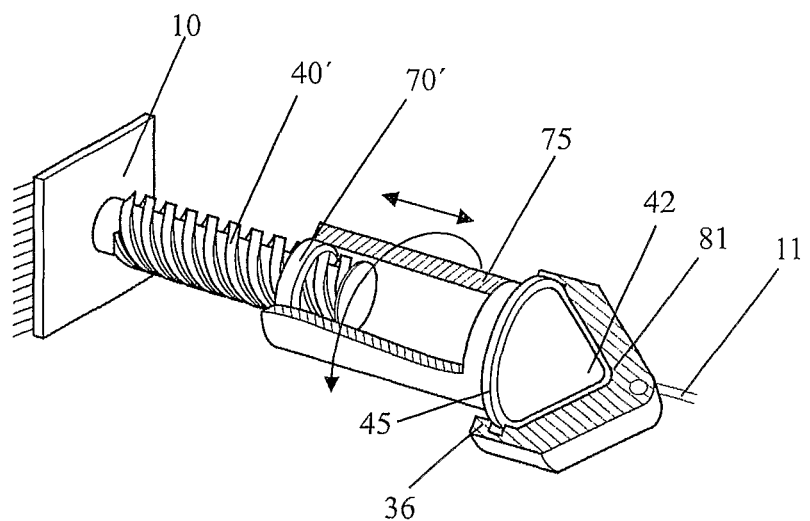
Figures 20A, 20B:
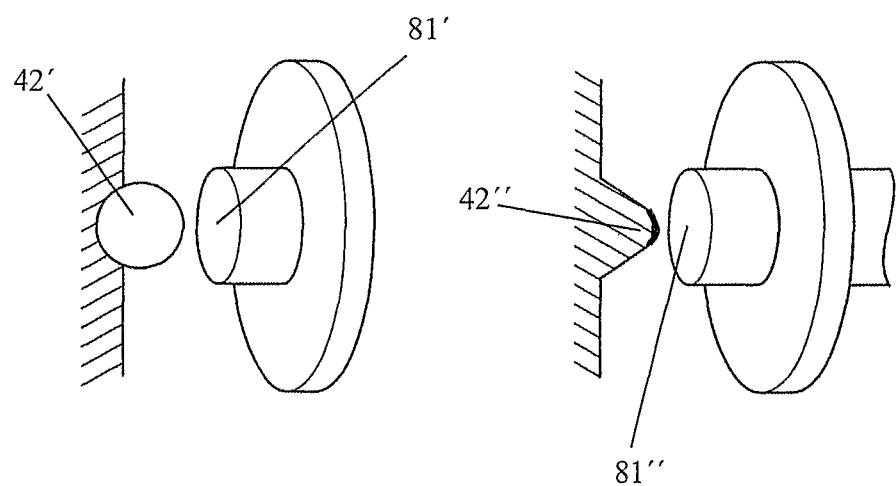
Figure 21:
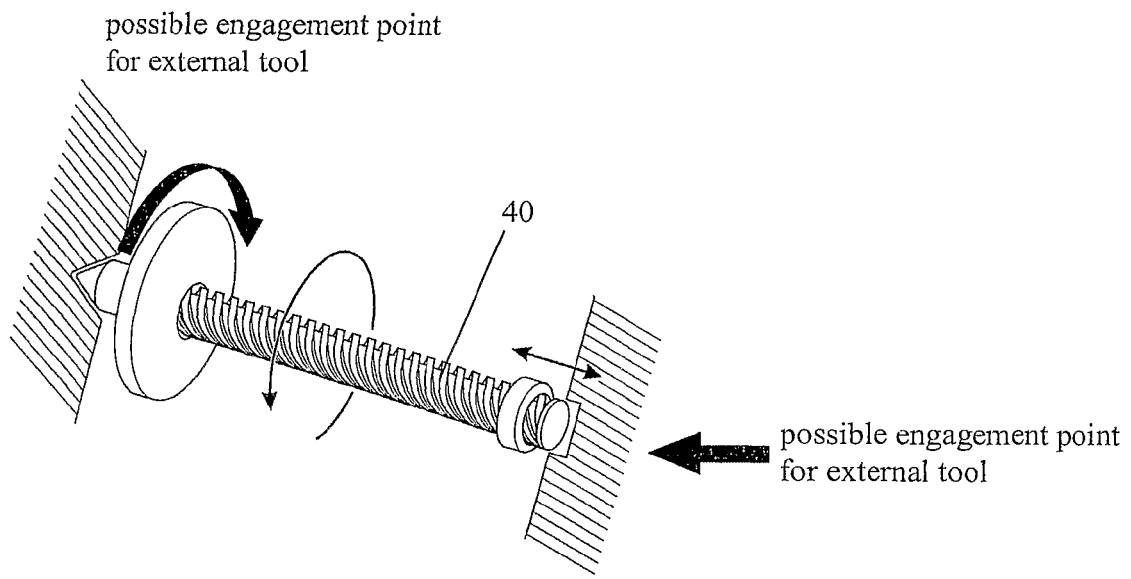

In the following, several aspects of the present invention are described in detail with reference to the accompanying figures. These figures show:

FIG. 1: a perspective presentation of a preferred embodiment of the device according to the invention in a first position;

FIG. 2: a detailed presentation of the compression spring used in the device of FIG. 1;

FIG. 3: a detailed presentation of the mounting frame used in the device of FIG. 1;

FIG. 4: a detailed presentation of the nut used in the device of FIG. 1;

FIG. 5: a detailed presentation of the spindle used in the device of FIG. 1 including the rotating disk arranged thereon;

FIG. 6: a detailed presentation of the bearing surface for the spindle as it is used in the device of FIG. 1;

FIG. 7: a detailed presentation of the second mounting frame used in the device of FIG. 1;

FIGS. 8a, 8b: detailed presentation of the upper and the lower part of the housing of the embodiment of FIG. 1;

FIG. 9a: a detailed presentation of the blocking insert used in the device of FIG. 1;

FIG. 9b: a schematic presentation of the operation of the blocking insert shown in FIG. 9a;

FIG. 10: a general presentation of the device of FIG. 1 in a further position;

FIG. 11: a sectional view for explaining the functional contact between the rotating disk and the function surface;

FIG. 12: a general view of a further embodiment of the device according to the invention;

FIG. 13a-c: detailed presentations of the blocking means in the embodiment of FIG. 12;

FIG. 14: a detailed presentation of the blocking means, when the housing is closed;

FIG. 15: a horizontal section of the embodiment of FIG. 12;

FIG. 16: a detailed presentation of the nut in the embodiment of FIG. 12;

FIG. 17: a detailed presentation of a sealing in the embodiment of FIG. 12;

FIG. 18: a detailed presentation of an O-ring for sealing the blocking means in the embodiment of FIG. 12;

FIG. 19: a schematic representation of an alternative embodiment of the pre-sent invention with a fixed spindle and rotating threads;

FIG. 20a,b: Alternative embodiments of the point contact;

FIG. 21: A schematic representation of possible engagement points of an external tool for rotating the spindle; and FIG. 22: A schematic representation of bearings for the spindle on both ends for rotating the spindle as shown in FIG. 21.

DETAILED DESCRIPTION OF PREFERRED EMBODIMENTS

In the following a presently preferred embodiment of the invention is described with reference to a device for providing a pre-tension in a Bowden cable. However, it is to be understood that the present invention can also be used for creating a pre-tension in other pulling elements, for example a linkage. The underlying mechanical principle can furthermore also be used to create instead of a tensile stress a compressive stress, for example in the outer sheath of a Bowden cable.

FIG. 1 shows a general presentation of the arrangement in a first configuration. Two sections 10, 11 of a cable are attached inside a lower half 1 of a housing to a first mounting frame 20 and a second mounting frame 30, respectively, which is arranged at the opposite end of the housing 1. The arrangement shown in FIG. 1 is therefore provided between two sections 10, 11 of the cable to be tensioned, for example at any position between a parking brake lever and the respective brake on the wheel (not shown). However, it is also possible to arrange the assembly shown in FIG. 1 at one of the two ends of the cable, i.e. in the above example either at the brake lever or at the brake of the wheel. In this case the further section of the pulling element according to the invention is formed by the portion of the attached operated or operating component, which is directly adjacent to the first 20 or to the second mounting frame 30.

The first mounting frame 20 can slide within the housing 1. To this end it comprises preferably one or more lateral projections 21 which can slide on corresponding sliding surfaces 7 of the lower half 1 of the housing. Thus, a jamming of the sliding movement of the first mounting frame is avoided. The mounting frame 20 is shown in detail in FIG. 3. At its rear end it comprises an opening 23 for inserting the end of the section 10 so that a thicker part 12 at the end of the section 10 is arranged on the interior side of the mounting frame 20. Instead of the opening 23 also a suitably shaped slit may be provided allowing during assembly to insert the end of the section 10 from the side. A further opening 25 is arranged at the end which is opposite to the opening 23. A spindle 40, which is discussed further below, extends in the situation shown in FIGS. 1 and 10 through this opening 25. The mounting frame 20 has a length which corresponds essentially to half of the overall sliding section 5 in the lower half 1 of the housing so that it can receive substantially the complete spindle 40 during the transition from the position shown in FIG. 1 to the position shown in FIG. 10.

As can clearly be seen in FIG. 3, the mounting frame 20 is preferably made from a bent sheet, preferably a sheet made out of DC04 steel by bending and stamping the lateral projections 21 and the openings 23 and 25. The ends of the steel sheet are preferably overlapping in the region of the opening 23 for providing a sufficient stability. Alternatively, other manufacturing methods are also conceivable for the mounting frame 20, for example injection molding of a sufficiently stable plastic component.

A second mounting frame 30 is arranged on the side opposite to the mounting frame 20 in the lower half of the housing, which comprises in a similar manner an opening 33 for the second section 11 and which is also preferably made from a stamped and bent sheet of the above indicated steel (cf. FIG. 7). An opening 35 is arranged on the side opposite to the opening 33 of the second mounting frame 30, which can either be provided as a slit-like recess or also as a substantially round opening like the opening 25. As can be derived from FIG. 1, the above mentioned spindle extends in the final state also through the opening 35. However, in contrast to the first mounting frame 20, the second mounting frame 30 is preferably fixed inside the lower half 1 of the housing, which comprises to this end a separation 6 (cf. FIG. 1).

An elasticity element 50 is arranged around the first mounting frame 20 providing a force, which is illustrated in FIG. 1 by an arrow. As a result, the first mounting frame 20 is pushed in the direction of the arrow so that the end of the first section 10 is moved closer to the end of the second section 11. As a result, the pre-tension in the cable extending from the section 10 is increased (and thereby in the complete cable), since the cable is effectively shortened. The elasticity element 50 will push the first mounting frame 20 in the direction of the arrow (cf. FIG. 10) until there is a balance of force between the pre-tension in the cable and the compressive force of the elasticity element 50. Therefore, the design of the elastic properties of the elasticity element 50 defines the resulting pre-tension in the cable.

In the particularly preferred embodiment shown in FIGS. 1 and 10 the elasticity element 50 is provided as a spiral compression spring which is preferably made from a spring steel in accordance with DIN 17223/1-C. The spring wire has preferably a thickness of 2.7 mm and is wound such that a wire length of 198 mm leads in the compressed form of FIG. 1 to a length of the spring of 41 mm.

However, instead of a compression spring also a tension spring can be used which is in the assembly of FIG. 1 arranged around the spindle 40 and which tries to pull the mounting frame 20 to the right. Also a combination of compression spring and tension spring or the use of a torsion spring is possible. Finally, it is also conceivable to use instead of spiral springs other elastic elements, for example pneumatic elements or elements using oil pressure or even suitable elastomers.

The extension of the spring 50 and the resulting sliding movement of the first mounting frame 20 leads to a rotation of the above mentioned spindle 40. To this end a nut 70 is preferably arranged at the opening 25 of the first mounting frame 20 having inner threads 71 (cf. FIG. 4). The nut 70 is rigidly connected to the first mounting frame 20, for example by welding or other techniques. Alternatively, the front opening 25 may comprise the inner threads 71. However, in this case the first mounting frame 20 must preferably be made from a material allowing to cut precise and smoothly running threads. Furthermore, the mounting frame 20 should have a sufficient thickness in this modified embodiment at its front end to provide a sufficient surface for the inner threads 71.

The nut 70 which is used in the presently preferred embodiment is produced from a steel C35Pb and manufactured by machining. In the preferred embodiment, the width of this component is approximately 10 mm.

The spindle 40 (cf. FIG. 5) comprises outer threads 41 corresponding to the inner threads 71. The threads 41 and 71 are overhauling threads, in that they have a comparatively high pitch, which is above the critical angle, to allow an easy rotation of the spindle under a linear movement of the first mounting frame 20. Particularly preferred are trapezoidal threads. The spindle 40 is preferably made from a steel of the type 35B2 and has preferably a length of approx. 50 mm.

The end of the spindle 40, which is opposite to the nut 70, extends through the opening 35 of the second mounting frame 30 and terminates in a preferably conically tapering bearing tip 42. When the spindle 40 rotates, the bearing tip 42 is guided in a bearing surface 81 of a bearing insert 80, which is shown in detail in FIG. 6. The section of FIG. 11 shows that the opening angle of the bearing surface 81 is slightly greater than the angle of the bearing tip 42 leading to an essentially point-shaped contact as in a needle bearing. When the elasticity element pushes the spindle and thereby the bearing tip in the direction of the bearing surface 81, bearing tip 42 and bearing surface 81 cooperate to form a low-friction bearing. As a result, a particularly easy rotation of the spindle 40 is achieved by simple constructive means. The bearing insert 80 comprising the bearing surface 81 is preferably made by injection-molding a plastic material, for example polyoxymethylene (POM). The preferred diameter of the bearing insert 80 is 20 mm. Instead of using a bearing insert 80, the bearing surface 81 can also be directly arranged in the housing.

FIGS. 20*a* and 20*b* show schematically alternative embodiments of the point contact for an easy rotation of the spindle 40: In FIG. 20*a* a spherical projection 42' can be seen contacting a correspondingly shaped contact surface 81' at the end of the spindle 40. FIG. 20*b* discloses another arrangement, which is a mirror image to the embodiment of FIG. 11. The wall of the housing comprises a bearing tip 42", which is received in a corresponding bearing surface 81" at the end of the spindle. The point contact assures in all embodiments a particularly easy rotation of the spindle 40, which is advantageous for the automatic adjustment of the tension.

Directly in front of the bearing tip 42 the spindle comprises a rotating disk 45, i.e. an essentially circular projection having preferably a diameter of 30 mm. The rotating disk 45 allows to control the rotatability of the spindle 40 and thereby the automatic creation of a pre-tension in the cable as follows:

As long as the tension created by the compression spring 50 is greater than the tension in the cable, the first mounting frame 20 will be pushed in the direction of the arrow (i.e. in the axial direction as defined by the arrow in FIG. 1). At the same time the bearing tip 42 of the spindle 40 is slightly pushed in the direction of the arrow and contacts the bearing surface 81, as explained above. Because there is sufficient backlash in the axial direction between spindle 40 and second mounting frame 30, as a consequence also the rotating disk 45 is separated from the friction surface 36 (cf. the section of FIG. 11, wherein the spindle moves in the described situation to the right, i.e. in a direction opposite to the arrow in FIG. 11). Now the spindle 40 can freely rotate and the compression spring 40 can move the first mounting frame 20 in the direction of the second mounting frame 30 which leads to an increase of the pre-tension in the cable.

When the increasing pre-tension in the cable approximately equals the force provided by the compression spring 50, the rotation of the spindle 40 terminates and the automatic adjustment is finished. If subsequently a pulling movement is to be transmitted by the cable, the rotating disk 45 is pulled against the friction surface 36 (cf. the arrow in the section of FIG. 11) which immediately blocks a rotation of the spindle. The previously adjusted distance between the first mounting frame 20 and the second mounting frame 30 therefore remains unchanged. As a result, the device shown in FIG. 1 assures a certain pre-tension in the cable as long as the compression spring 50 can still push the first mounting frame 20 in the direction of the arrow (FIG. 1). The dimensions of the various components are designed such that an adjustment range is provided of more than 10 mm, preferably more than 20 mm and particularly preferably approximately 30 mm. The created pre-tension is preferably in the range between 20 and 50 N.

Figure 22:
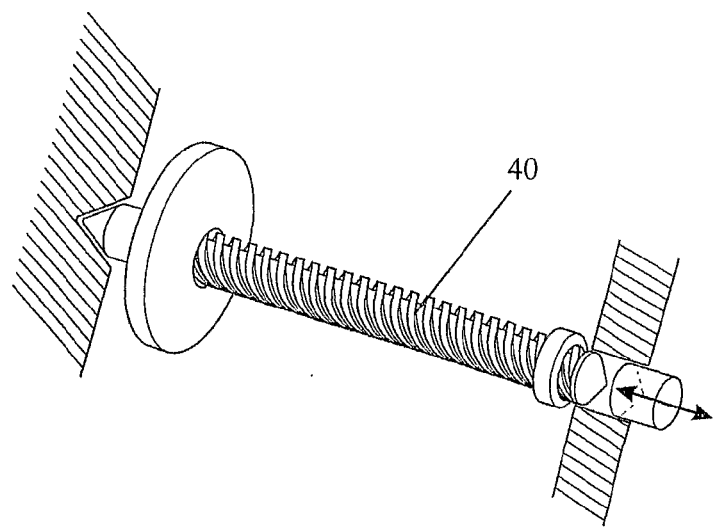

In a further embodiment shown schematically in FIGS. 21, 22, it is possible to rotate the spindle 40 with an external tool (not shown) to push the first mounting frame 20 back against the force of the compression spring 50. This is for example meaningful if the adjustment range of the device is exhausted after a use of several years and a significant elongation of the cable. In this case, the cable can be replaced or shortened in a garage (or be roughly manually adjusted using a different adjustment device), and can then once again be connected to the rearmed device for compensating future elongations of the cable and to assure again a sufficient pre-tension. For rotating the spindle 40 with an external tool the rotating disk 45 may for example comprise peripheral teeth (not shown) which can be engaged by a gear wheel of an external tool (not shown) through a suitable opening in the housing 2.

This option is schematically shown in FIG. 21. Alternatively, the external tool may also engage along the axis of the spindle 40 to cause a rotation. As schematically disclosed in FIG. 22, it is in addition advantageous to provide a second point contact for the bearing of the spindle 40 so that the spindle can on both ends easily rotate. A friction of the rotating disk at the friction surface (not shown in FIG. 22), during "recharging" the device is therefore excluded. Only the force necessary for the deformation of the elasticity element (not shown in FIG. 22) is therefore required.

Apart from the described blockade of a rotation of the spindle 40 due to a pulling tension in the cable, the rotation of the spindle can also be blocked without an external load. To this end the device of FIG. 1 comprises a blocking means, which is preferably provided as a wedge-shaped insert 100 extending through an opening in the upper half 2 of the housing and pressing the rotating disk 45 in the direction of the arrow (cf. FIG. 11) against the rear friction surface 36. The peripheral surface of the rotating disk 45 comprises a circumferential step 46 (cf. FIG. 5), which is engaged by the wedge-shaped insert 100.

As a result, a frictional contact is manually created, which reliably blocks a rotation of the rotating disk 45. This is the situation shown in FIG. 11. If the wedge-shaped inset 100 is upwardly displaced, to allow again an automatic adjustment of the pre-tension, the spring 50 can push the mounting flame 20 to the right. As a result, also the spindle 40 is slightly pushed into the same direction so that the frictional contact between the surface 36 and the rotating disk 45 is removed. Since the spindle 40 can now again freely rotate with its bearing tip 42 in the bearing surface 81 of the bearing insert 80, the spring 50 can continue to push the mounting frame 20 and cause the required pre-tension in the cable as described above.

The blocking insert 100 is preferably used to avoid a relaxation of the compression spring 50 or the like before the cable or another pulling element has been fully connected, for example attached to the wheel brake and the brake lever in case of a parking brake.

The blocking insert comprises preferably a security means against an unintended release. To this end, a slidable projection 101 is arranged on the side of the insert 100 in the preferred embodiment shown in FIGS. 9a, 9b and 11 (cf. FIG. 9a), which can be inserted into a corresponding opening 8 in the upper half 2 of the housing by a lateral movement (cf. the double headed arrow in FIG. 11). As a result, it is avoided that the blocking insert 100 becomes unintentionally detached and releases the rotating disk 45.

The blocking insert 100 shown in detail in FIG. 9a is preferably made from fiber glass reinforced plastic material. Particularly preferred is a polyamide No. 6.6 reinforced with 30% glass fibers.

In addition to the explained preferred embodiment, it is also conceivable to provide the rotating disk 45 with recesses at its circumferential surface, which are directly engaged by the insert 100 for blocking a rotation. However, the above explained preferred embodiment provides compared to this more simple alternative the advantage that the spindle 40 can be fixed in any arbitrary angular position and not only in certain orientations, when a recess is positioned directly below the insert 100. Other possibilities for blocking the spindle rotation will also be considered by the person skilled in the art. The use of an electromechanical control element is also conceivable to remotely start the automatic adjustment of the pre-tension by means of an electric control signal.

FIGS. 8a and 8b, finally, show how the two halves 1 and 2 of the housing can be clipped to each other by means of clipping projections 9. The use of screws is also conceivable, in particular, if the inner components should be easily accessible for maintenance purposes. If the overall arrangement is filled with oil or the like for lubrication, a suitable seal (not shown in FIGS. 8a and 8b) may be arranged on the contact surfaces of the two halves 1, 2 of the housing.

The halves 1 and 2 of the housing are preferably also made by injection molding a glass fiber reinforced plastic material. A presently preferred material is polyamide No. 6.6 reinforced with 20% glass fiber.

FIGS. 12 to 18 illustrate a further, presently preferred embodiment. The general construction corresponds to the device shown in FIGS. 1 to 11. Therefore, only deviations of the second embodiment compared to the first embodiment will be explained in the following.

In particular, the embodiment of FIG. 12 comprises several seals which completely seal the device from its environment: A peripheral seal 201 seals the gap between the two halves of the housing. Seals 203 serve to seal the openings for the entry of the sections 10 and 11 of the cable into the housing of the device. FIG. 17 shows the seal 203 in a detailed presentation. The seal 203 is preferably manufactured by injection molding EPDM and comprises dimensions adapted to the thickness of the cable and the size of the opening of the housing. The peripheral seal 201 is preferably made from NBR having a Shore A hardness of 70 or by bi-injecting TPE. Instead of the seal 203 the two halves of the housing can also be sealed to each other using ultrasonic welding.

FIGS. 13a to 13c illustrate the presently preferred blocking means 210 for blocking the automatic adjustment of the pre-tension in the device of FIG. 12. Similar to the blocking means 100, which was explained above, the rotating disk 245 is also in the embodiment of FIG. 12 pressed against the friction surface 236 by means of a wedge-shaped projection 211. The wedge-shaped protection 211 is arranged below an essentially circular base 212 which is arranged in a corresponding receptacle 214 of the housing (cf. FIG. 14). To facilitate the release of the automatic adjustment of the pre-tension one or more springs 215 are additionally provided. When the latching means 220, which essentially corresponds to the latching means 101 of FIG. 9b, is released, the spring 215 pushes the base 212 upwardly together with the wedge-shaped projection 211. This is the situation shown in FIG. 13a. Due to the lateral projections 227 (cf. FIG. 13c) the upward movement of the base 212 is limited so that it does not become fully detached from the housing.

FIG. 13b shows an arrangement prior to the release of the automatic adjustment, i.e. a situation wherein the wedge-shaped projection 211 presses against an inclined backside 225 of the rotating disk 245 to cause the frictional contact with the friction surface 236. Compared to the step 46 explained above, an inclined backside 225 is presently preferred.

As can in particular be derived from the horizontal section of FIG. 15, the frictional contact is in this embodiment made with a friction element 50 arranged between the rotating disk 245 and the mounting frame 30 and not with the mounting frame 30 itself. Since the function element 250 is not subjected to high mechanical loads as the second mounting frame 30, it can be made from materials which are optimized for creating a high friction and therefore have a higher friction coefficient. As a result, the rotation of the spindle is in an even shorter time stopped in case of a pulling load.

FIGS. 13a and 13b additionally indicate that preferably also the blocking means 210 comprises a seal which is provided as a peripheral O-ring 230, shown in detail in FIG. 18. The sealing ring 230 is preferably manufactured by injection molding NBR with a Shore A hardness of 72.

FIG. 16, finally, discloses the nut 260 as it is used in the embodiment of FIG. 12 to transform the linear movement of the first mounting frame 20 into a rotation of the spindle 40. The reinforcement of the nut on the side which is positioned inside the mounting frame (cf. FIG. 12 and the section of FIG. 15) can be clearly recognized. This serves to assure that even high pulling loads can be transmitted. The nut 260 is preferably made from machined C35Pb-steel.

FIG. 19 shows schematically a partial view of a further embodiment of the present invention. For the sake of simplicity the surrounding housing is not shown.

In contrast to the embodiments explained above, the spindle 40' of the embodiment of FIG. 19 does not rotate under a change of the distance between the attachment of a section 11 of the cable and an anchoring 10 to a component (there could also be a further section of the cable). Instead, there is a rotating assembly, which comprises at its end directed to the spindle a nut 70'. The nut 70' and a sleeve 75, which is rigidly connected to the nut 70' and which receives the spindle 40', both rotate, when they perform a linear movement under the influence of an elasticity element (not shown). The elasticity element is similar to the embodiments shown above arranged in a surrounding housing and provides the elastic force. As a result, the distance between the attachment of the section 11 and the anchoring 10 changes, i.e. is shortened to generally tighten the cable.

At the opposite end, the rotating sleeve 75 comprises a rotating disc 45 causing under load a frictional contact to a friction surface 36 so that a rotation of the sleeve 75 and therefore a change of the distance between the section 11 and the anchoring 10 is blocked. Also in the embodiment of FIG. 19, the rotation of the rotating disc 45 may additionally be blocked by devices as they were discussed above in the context of the other embodiments.

Finally, it can be seen that the rotating element, which is in the embodiment of FIG. 19 the sleeve 75, terminates in a bearing tip 42 received in a corresponding bearing surface 81. Also in this embodiment, the bearing surface 81 is designed such that essentially a point contact is achieved. Accordingly, the sleeve 75 can easily rotate.

The invention claimed is:

1. Device for automatically adjusting pre-tension of a cable (10, 11) consisting of a first section (10) and a second section (11), the device comprising:
   a. a first mounting frame (20) and a second mounting frame (30), both arranged inside a closed housing (1, 2); wherein
   b. the two sections (10, 11) of the cable (10, 11) are attached inside the housing (1, 2) to the first mounting frame (20) and the second mounting frame (30), respectively;
   c. a single elasticity element (50) contained within the housing (1, 2) said single elasticity element (50) acting on the first mounting frame (20) for the first section (10) of the cable for increasing the pre-tension;
   d. inner threads (71) arranged at the first mounting frame (20) and acting on outer threads (41) of a spindle (40) having a longitudinal axis defining an axial direction, both said threads comprising overhauling threads, such that an axial force causes the threads to advance, whereby a change of the distance between the first mounting frame (20) and the second mounting frame (30) causes simultaneously a rotation of the spindle (40); and
   e. blocking elements (36, 45; 236, 245) which are arranged such that tension the cable (10, 11) alone engages the blocking elements to block rotation of the spindle (40) when the cable (10, 11) is under pulling load; wherein
   f. the first section (10) of the cable (10, 11) is attached on one side of the first mounting frame (20) and a nut (70) with said inner threads (71) is rigidly connected to another side of the first mounting frame (20); and wherein
   g. the first mounting frame (20) comprises at least one lateral projection (21), which slides on a corresponding sliding surface (7) of the housing (1, 2) to prevent the first mounting frame (20) from rotating relative to the second mounting frame (30);
   h. wherein the second mounting frame (30) is rigidly fixed inside the housing (1, 2) on a side opposite to the first mounting frame (20).

2. Device according to claim 1, wherein the blocking elements block a rotation of the spindle by a frictional contact.

3. Device according to claim 2, wherein the blocking elements comprise a rotating disk connected to the spindle and a friction surface, wherein the frictional contact occurs between the rotating disk and the friction surface.

4. Device according to claim 3, wherein the spindle has a bearing tip which rotates in a bearing recess.

5. Device according to claim 4, wherein the bearing recess has a shape to provide a point bearing contact for the bearing tip.

6. Device according to claim 5, wherein the device further comprises removable blocking means which is manually engaged to block the rotation of the spindle independently from the pulling load and independently from the blocking elements.

7. Device according to claim 6, further comprising a latching means to latch the blocking means in a position blocking the rotation of the spindle.

8. Device according to claim 1, wherein the elasticity element is arranged essentially coaxially or in parallel to a pulling direction of the pulling element.

9. Device according to claim 1, wherein the elasticity element is arranged around the first mounting frame and pushes against the at least one lateral projection of the first mounting frame.

10. Apparatus for adjusting an effective length of a pulling element comprising:
- a first mounting frame, said first mounting frame having an aperture adapted to receive an end portion of a first section of said pulling element;
- a second mounting frame, said second mounting frame having an aperture adapted to receive an end portion of a second section of said pulling element, said first mounting frame being arranged for sliding motion with a housing supporting said second mounting frame, said first mounting frame being constrained against rotation relative to said housing by at least one lateral projection engaging a sliding surface between said first mounting frame and said housing;
- a spindle comprising a rigid body having a first end and a second end, the first end comprising an elongate threaded portion having a longitudinal axis defining an axial direction, the second end comprising a substantially disk-shaped portion, the elongate threaded portion including overhauling threads engaging corresponding overhauling threads on said first mounting frame, the substantially disk-shaped portion having a first surface comprising an end adapted to engage a bearing surface on said second mounting frame, the substantially disk-shaped portion having a second surface opposite the first surface, the second surface adapted to engage a friction surface on said second mounting frame, the disk-shaped portion being mounted to the second mounting frame for rotation with sufficient axial backlash to enable the threaded spindle to move between a first position in which the end of the substantially disk-shaped portion engages the bearing surface and the second surface is spaced-apart from the friction surface to allow rotation of the spindle, to a second position in which the end disengages the bearing surface and the second surface engages the friction surface to prevent rotation of the spindle; and
- an elastic member exerting a force in the axial direction, which moves said first mounting frame toward said second mounting frame and simultaneously causes the spindle to rotate to reduce the effective length of the pulling element as said pulling element moves from a tensioned to an un-tensioned state.

11. The apparatus of claim 10, wherein:
the spindle moves from the first position to the second position axially without rotation.

12. The apparatus of claim 10, wherein:
the elongate threaded portion of the spindle comprises external threads.

13. The apparatus of claim 10, wherein:
said at least one lateral projection comprises two lateral projections.

* * * * *